Nov. 15, 1966  W. F. HOWARD  3,285,181
AUTOMATIC PUMP ALTERNATOR
Filed Jan. 16, 1964  2 Sheets-Sheet 1
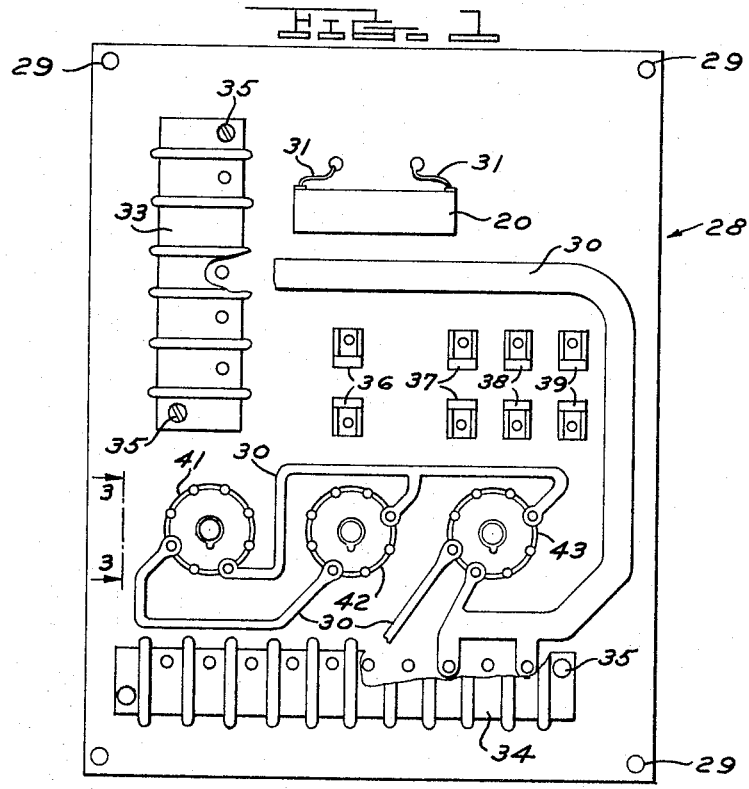
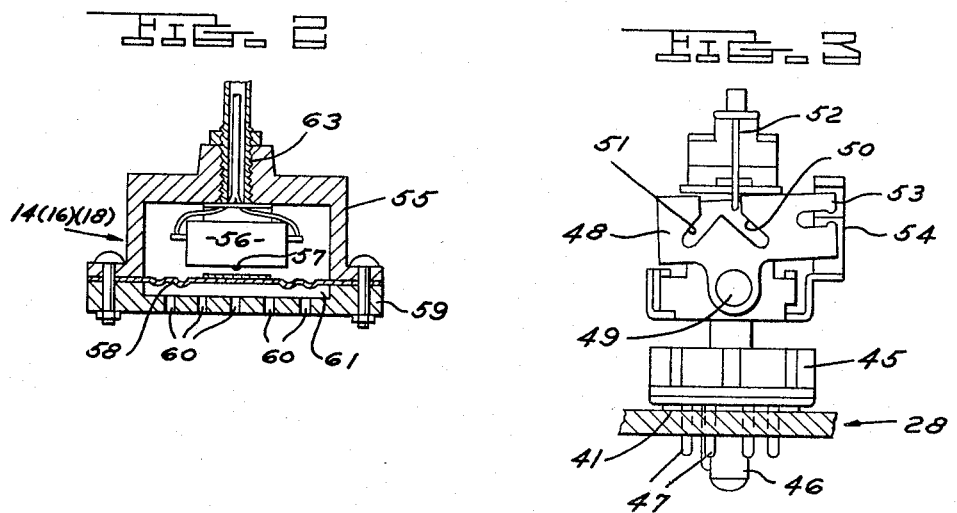
INVENTOR.
WILLIAM F. HOWARD
BY *Whittemore, Hulbert & Belknap*
ATTORNEYS Nov. 15, 1966  W. F. HOWARD  3,285,181
AUTOMATIC PUMP ALTERNATOR
Filed Jan. 16, 1964  2 Sheets-Sheet 2

INVENTOR.
WILLIAM F. HOWARD
BY
ATTORNEYS

United States Patent Office 3,285,181
Patented Nov. 15, 1966

3,285,181
AUTOMATIC PUMP ALTERNATOR
William F. Howard, Bloomfield Hills, Mich., assignor to Howard Electric Company, Detroit, Mich., a corporation of Michigan
Filed Jan. 16, 1964, Ser. No. 338,197
16 Claims. (Cl. 103—11)

The present invention relates to improvements in an automatic pump alternator system for the control of dual pumps in the pumping out of water or liquid from an accumulator of one sort or another, such as a portion of a sewage line, a water accumulating sump, a tank, or the like, being hereinafter referred to by the general term "container." More particularly, the alternator system relates to the successively staged or alternated operation of two like pumps having their intakes in the container, each pump being operated by a motor under the automatic control of a liquid level or hydrostatic pressure-responsive switch set which, through relay provisions of the invention, governs the initiation and termination of energization of the respective pump motors or, under some conditions, their simultaneous operation.

While the above indicates that the primary intended utility of the invention is in the pumping of water from a tank or like container, the invention is not to be considered to be limited in this respect, for the system may also be used in other applications. Thus applications are contemplated for the control of air conditioners, heaters, furnaces, fans, motors, and the like, to the extent that such control may be exerted through the agency of means like or analogous to those utilized in dual-pump control.

One of the objects of the invention is to provide a dual unit alternator system responsive to initial activation by pressure-responsive devices, such as the liquid level responsive diaphragm or like means of a pair of pumps pumping from a container, in which power and alternator relays are utilized in conjunction with switches directly actuated in response to pressure change.

The power relays govern energization of the pump motors, holding the same in action while the system is functioning in alternate pump cycles or in conjoint pump operation. The alternator relay means is preferably in the form of a snap-over impulse relay which governs alternate or conjoint phasing. The relays render the pressure responsivity more sensitive by diminishing the hydrostatic pressure differential required to initiate pump motor energization, i.e., by relieving the load requisite to close the pressure-responsive switches.

Another general object is to provide a system of the type described, employing dual pump units for the purpose of equalizing wear on the respective units and associated equipment, yet at the same time affording the capacity of a substantially larger unit, as when the pumps are concurrently operated, and extending the life of the respective units by providing a rest or cooling off period between their respective alternate cycles.

Thus, in the provision of improved control means to alternately cut in and cut out dual pump or like units, and to operate the same simultaneously under certain circumstances, the system is one which automatically adjusts the performance of its equipment precisely to accord with load demand.

Coupled with the alternator and power relay means referred to above, the improved system includes means to originate an audible or visible alarm signal under an unusual or heavy load condition, or to signal a partial failure of the equipment, for example a failure of a pump or other component, so that prompt investigation may be made and proper attention paid.

More specifically, the invention contemplates the provision of a dual unit alternator system which is rendered very compact in that its electrical control wiring and connections are effected through the use of a printed circuit panel. More especially, the invention contemplates the incorporation in such panel of plug-in sockets to receive the alternator and power relays, the panel also being equipped with wiring terminal blocks for the reception of wiring leads to connect the pump motors and other associated components with the printed circuitry of the panel. Also incorporated into the panel and electrically connected with its circuitry are protective fuse clips, or equivalent circuit breaker or other current interrupting devices.

The invention also contemplates, inasmuch as its automatic control agencies will normally operate in a moist atmosphere or, as suitably encased in a manner not germane to the invention, may be temporarily submerged in water, a novel provision to protect against deterioration as the result. Such provision resides in the mounting of an appropriate resistance heater directly on the printed circuit panel for direct wiring to the power leads. The continual operation of such heater prevents corrosion of operative parts and subsequent likely failure.

The foregoing as well as other objects will become more apparent as this description proceeds, especially when considered in connection with the accompanying drawings illustrating the invention, wherein:

FIG. 1 is a front view of a printed circuit panel incorporating relay socket, heater, terminal block and fuse clip provisions in accordance with the invention, with external wiring connections omitted for the sake of simplicity, save in the case of the heater;

FIG. 2 is a fragmentary sectional view schematically illustrating a hydrostatic pressure or liquid level-responsive switch element suitable for pump motor control through the agency of relay means, in accordance with the invention;

FIG. 3 is a fragmentary view in section along a line corresponding to line 3—3 of FIG. 1, showing a conventional impulse type relay such as is employed for the alternator relay of the present system;

Figure 4:
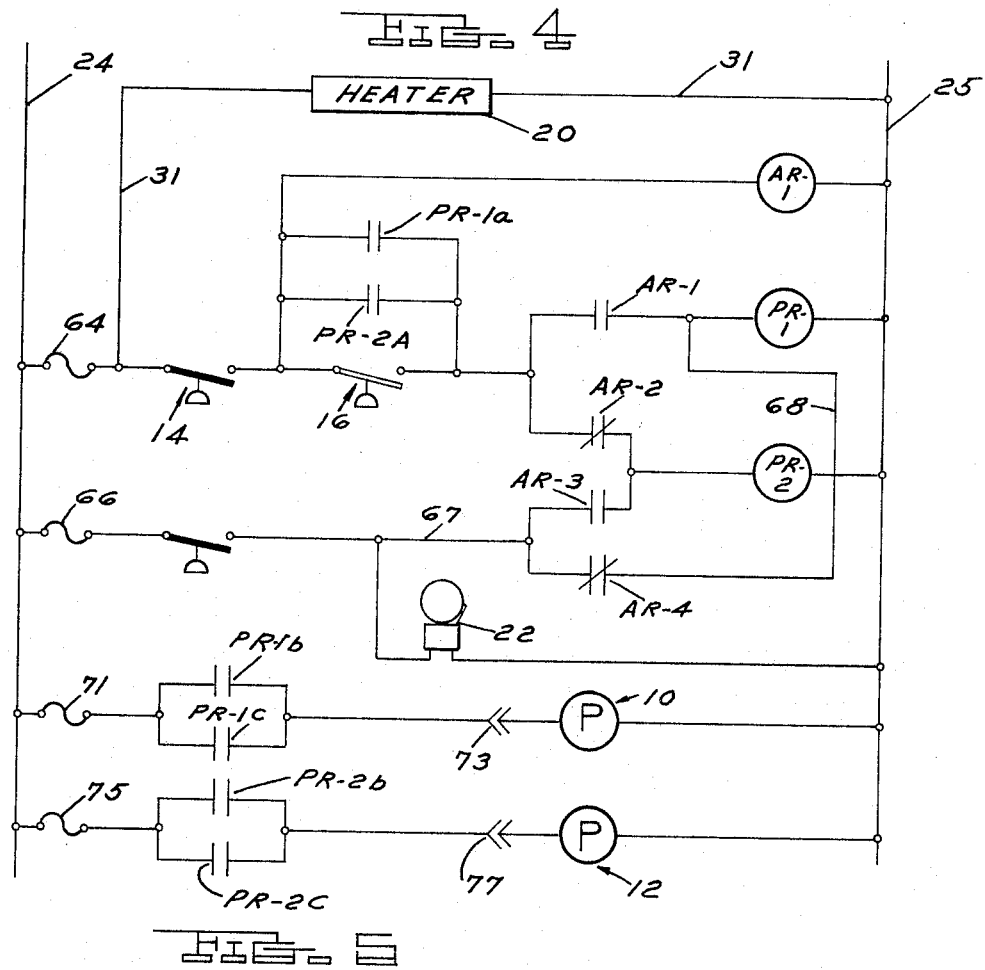
FIG. 4 is a schematic wiring diagram of the system, including alternator and power relays wired to pressure-responsive switch means and the dual pump or like components.

As indicated above, though capable of wide utilization, the system of the invention is primarily intended for the alternating control of the energization of the electric motors of a pair of hydraulic pumps, shown only in the wiring diagram of FIG. 4 inasmuch as they are entirely conventional in nature. These pumps are generally designated 10 and 12, on the understanding that the same reference numerals may be considered to apply in the description to follow to the respective pump motors (not shown). FIG. 4 also schematically illustrates first, second and third hydrostatic or liquid level controlled switches 14, 16 and 18, respectively; and it is contemplated that these switches may also be conventional ones available to the trade, having in general the structural characteristics which are schematically depicted in FIG. 2 of the drawings.

The wiring diagram of FIG. 5 further shows a moisture evaporating electrical resistance heater 20 as wired in the circuit; a buzzer or other audible alarm unit 22; an impulse type alternator relay AR, such as is rather schematically shown in FIG. 3, being of a known nature; and first and second power relays PR-1 and PR-2, which have normally open contacts wired in a manner to be later described. These and other components are electrically connected across 115 volt power leads 24 and 25.

Now referring to FIG. 1 of the drawings, it shows the printed circuit panel 28 which, as such, is in general a conventional type, having conductive corner terminal portions 29, as well as, on both the front panel face appearing in FIG. 1 and the rear face (not shown), appropriate printed, conductive buss and individual paths, such as are indicated at 30 in FIG. 1.

In these respects, circuit panel 28 is entirely conventional, being constituted by a phenolic or like type insulating base to which the printed conductive provisions are applied in accordance with any appropriate or known procedure.

The front of the panel 28 serves as a mount for the heater 20, whose leads 31 are taken to the rear through panel apertures; as well as for a pair of multiple terminal strips or blocks 33, 34 of a known type, secured to the panel by screws 35. Conductive supporting clips for protective fuses for the pumps 10, 12 and switches 14, 16 and 18 are mounted to the front of panel 28, being of course suitably connected electrically to printed circuitry (not shown) of the latter. These clips include sets of clips 36, 37, 38, 39 for the respective reception of fuses (shown in FIG. 4) for the first pump 10, the second pump 12, the first and second switches 14, 16, and the third switch 18.

Finally, in accordance with the improvement of the invention, the printed circuit panel 28 receives therethrough the three conventional sockets 41, 42 and 43 to receive alternator and power relays AR, PR-1 and PR-2 (FIG. 4), with the sockets wired in the panel's circuitry to complete relay coil circuits when the appropriate relays are plugged therein. The panel 28 is intended to be mounted in a suitable watertight enclosure (not shown) having means to seal conductors departing from the latter against entry of liquid to the interior. Such conductors are connected electrically to pump motor and other components in the manner appearing in FIGS. 4 and 5. As indicated above, the panel 28 is enclosed in this manner for disposition as closely as possible adjacent the components in question, oftentimes in a very humid or moist atmosphere, or, indeed, sometimes immersed, but with the assurance that the heater 20 will prevent the rising of a corrosive condition.

As indicated above, the alternator relay AR (FIG. 3) which is plugged in the panel socket 41 is an entirely conventional impulse type operating on a latching principle. The power relays PR-1 and PR-2 are also conventional, and are not physically shown. It suffices to say that the relay AR (FIG. 3) includes an insulating base 45 having a pilot stem 46 and a set of conductive terminal prongs 47 receivable in the female openings of socket 41. The relay AR also has a toggle-like latching plate 48 pivoted on a second insulating portion at 49, which plate has inclined divergent slots 50, 51 adapted to be engaged by an actuator 52 electromagnetically responsive to energization of the coil (not shown) of relay AR. Actuator 52 thus moves to shift and hold the plate 48 in one direction or another, and thereby operate, at the latter's forked extremity 53, an element 54 which actuates the four relay contacts of relay AR depicted in FIG. 4.

While, as indicated above, the relays AR, PR-1 and PR-2 are known types, they have never to my knowledge been employed as components of an alternator system in association with means, such as switches 14, 16, 18, sensitive and responsive to a changing condition or parameter of an installation, thus to produce a desired alternation of operation of dual units to adjust the condition, i.e., to correctively adjust the liquid level in the present instance. More especially, such relays have never been mounted as herein proposed to a printed electrical circuit panel.

FIG. 2 schematically shows a typical diaphragm switch suited to the purpose of switches 14, 16 and 18. It comprises an upper housing part 55 within which is mounted a normally open microswitch 56 having an operating button 57. A thin, corrugated metal diaphragm 58 is marginally clamped beneath button 57 between the housing part 55 and a bottom housing part 59, which part 59 has holes 60 communicating a pressure space 62 beneath the diaphragm 58 with the liquid in which the switch is immersed. The leads of switch 57 are taken out through a top fitting 63 of housing part 55 to connections in the wiring circuit shown in FIG. 4, being watertight protected of course. The operation of the switch of FIG. 2 is believed obvious to those having ordinary skill in the art.

The basic wiring of FIG. 4 is in the main believed self explanatory, especially in the light of the description of the operation of the system to follow. The coil of alternator relay AR is connected across power leads 24, 25 in a circuit including the first liquid pressure-responsive switch 14, with a fuse 64 connecting this switch to the lead 24; and the heater 20 is connected from the junction of fuse 64 and switch 14 to the power lead 25. A second circuit across leads 24, 25 includes the second liquid pressure-responsive switch 16, as series connected to switch 14; and the coils of power relays PR-1, PR-2, the latter being wired to the contacts AR-1, AR-2, AR-3 and AR-4 of alternator relay AR in a manner hereinafter described.

The normally open contacts PR-1a and PR-2a of the power relays are connected in shunt about pressure switch 16 to hold either or both of the pumps 10, 12 in operation when switch 16 cuts out, as will be described. It will be noted that the alternator relay contact AR-4 is connected about other of the series-connected contacts of relay AR direct to power relay PR-1. The remaining normally open contacts of the power relays are paralleled with one another in series circuit with the respective pumps 10 and 12.

The third liquid pressure-responsive switch 18 comes into play to put both pumps 10 and 12 into simultaneous operation in the event of an unusual rise of water in the container (not shown) receiving these pumps. Switch 18 is connected by a fuse 66 to power lead 24 and by a connector 67 to the common junction of the assumedly initially open and closed contacts AR-3 and AR-4, respectively, of alternator relay AR. As noted above, contact AR-4 is direct wired by a connector 68 to power relay PR-1. A connector 69 links the alarm unit 22 between connector 67 and power lead 25.

The terminals of the motor of pump 10 are connected across leads 24, 25 in a series circuit including a fuse 71 (receivable in the clips 37 of panel 28), and the second and third contacts PR-1b and PR-1c of power relay PR, as connected in parallel with one another, this circuit being completed through a plug-in jack 73. Similarly, the motor of the second pump 12 is series-connected across leads 24, 25 through a fuse 75 (receivable in panel clips 36), the paralleled second and third, normally open contacts PR-2b, PR-2c of the other power relay PR-2, and a jack 77.

The fuses 64 and 66 protecting switches 14, 16 and third switch 18, respectively, are received in the clips 38 and 39, respectively, of printed circuit panel 28.

In use, with the pumps 10 disposed at a common elevation in the liquid accumulator, container or tank (not shown), the pressure switches 14 and 16 are mounted in the container at respectively lower and higher elevations, so as to be successively closed upon the arising of the liquid level to an initial lower critical level and then to the higher level. The third pressure-responsive switch 18 is mounted for closing actuation upon the level coming still higher, indicating that simultaneous operation of the pumps 10, 12 is in order. It is contemplated that the pumps 10 and 12 may be identical or of the same pumping capacity, or they may be, respectively, of greater and lesser capacity, or vice versa.

In regard to the operation of the above described alternator system, reference should be had to FIG. 4. When the liquid in the container rises to a predetermined critical level, the resultant initial closing of the first pressure-responsive switch 14 results in the energizing of impulse alternator relay AR and actuation of its four series-connected contacts, closing the contacts AR–1, AR–3 and opening the contacts AR–2, AR–4.

When the liquid rises further to close the second switch 16, the power relay PR–1 is energized through alternator relay contact AR–1, closing power contacts PR–1a, PR–1b and PR–1c and energizing the motor of pump 10 through the series circuit of the latter and fuse 71. The closure of relay contact PR–1a establishes a holding circuit bypassing the second pressure switch 16, and pump 10 continues to operate to drop the liquid level after switch 16 opens in response to the drop of level. Switch 14 ultimately opens when the level is dropped to the lower critical point, whereupon both relays AR and PR–1 are de-energized and pump 10 stops operating.

If the liquid again rises sufficiently to close switch 14, alternator relay AR is again energized, now reclosing the contacts AR–2 and AR–4 and re-opening contacts AR–1 and AR–3. As liquid rises further to close switch 16, the second power relay PR–2 is energized through alternator relay contact AR–2, thus to close power relay contacts PR–2a (a holding contact), PR–2b and PR–2c, and the motor of pump 12 now operates. As the liquid level is dropped by pump 12 operating alone, the cycle repeats as described above, the opening of switch 14 ultimately de-energizing the system.

However, if the liquid should continue to rise to an extent to close the switch 18, the power relay PR–1 will be energized through contact AR–4 and connector 68, causing contacts PR–1a, PR–1b and PR–1c to close and pump 10 to operate jointly with pump 12. Alarm 22 is energized at the same time to signal an unusual load condition; whereupon an attendant will investigate, to discover (with the aid of signal lamps to be described) that both pump motors are operating due to an unusual load condition. Corrective measures may be taken if needed.

When the liquid level drops enough under concurrent dual pumping to open upper switch 18, the alarm 22 is de-energized and power relay PR–1 is de-energized at contact AR–4. Contacts PR–1b, PR–1c re-open and pump 10 stops; and as the liquid level continues to drop the above cycle is repeated until pressure switches 16 and 14 re-open.

As a possible emergency situation, let it be assumed that a cycle calls for the initial energization of the motor of pump 10, but that this motor has failed. In the ordinary manner, liquid rises to close switch 14. Alternator relay AR is energized, closing its contacts AR–1, AR–3 and opening contacts AR–2, AR–4. As the liquid level rises, switch 16 closes as before. Power relay PR–1 is energized, closing contacts PR–1a, PR–1b and PR–1c.

However, since pump 10 is inoperative, liquid continues to rise to close switch 18. Alarm 22 is energized and pump 12 comes into operation, since relay PR–2 has been energized through alternator contact AR–3. Liquid is pumped down by pump 12 until switch 18 re-opens, whereupon the alarm is turned off and pump 12 shuts down. As mentioned above, an investigating attendant finds repeating conditions indicating partial failure of equipment. However, the system functions as described until appropriate repairs can be made.

FIG. 4 shows the circuit components for a system having the power leads energized at 115 volts A.C.; and a system supplied by a 230 volt source is very similar, differing mainly in the fusing and wiring of contacts PR–1b, 1c, 2b, 2c.

Figure 5:
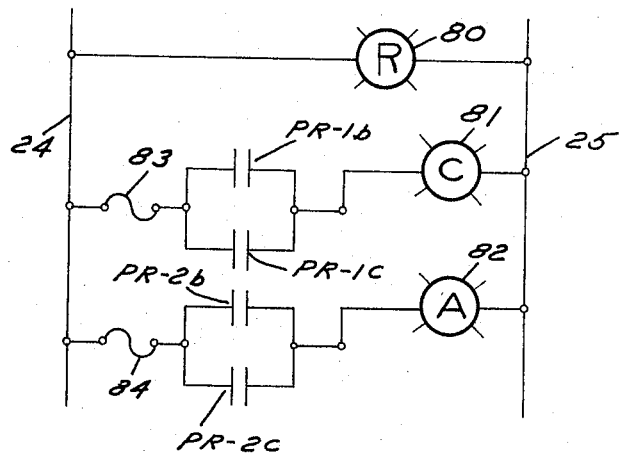
FIG. 5 is a subordinate wiring diagram to be considered as a part of that of FIG. 4, though separate from the latter, which concerns provision for producing visible signals under normal load conditions.

The simple schematic wiring diagram of FIG. 5 supplements that of FIG. 4 in regard to certain signal lamps which may be associated with the external part of the circuitry to inform an attendant visually in regard to the operating condition of the system. Thus, FIG. 5 shows a signal lamp 80 wired across power leads 24, 25 which is continually illuminated when a master switch (not shown) is closed to energize those leads. Further signaling or warning lamps 81, 82 are provided. Lamp 81 is shown as connected between leads by a protective fuse 83 and normally open power relay contacts PR–1b and PR–1c which are closed when pump 10 is in operation. Similarly, the lamp 82 lights up upon closure of power relay contacts PR–2b and PR–2c during the operation of pump 12. Again, a protective fuse 83 is employed. Thus the attendant may visually satisfy himself as to the operating condition of the system.

While reference has been made in the foregoing to the use of pressure-responsive switches 14, 16 and 18 of known type which employ a diaphragm as the pressure-sensitive member, it is to be understood that other types may be employed, for example bellows-controlled, Bourdon tube-controlled or piston-controlled. The same is true in regard to the alternator relay AR. It is a snap-over or latch-in impulse type and designs other than as shown in FIGS. 2 and 3 of the drawings are in contemplation. Similarly, the plug-in power relays PR–1 and PR–2 may be of any suitable design. Of course, conventional circuit breakers or other sorts of current interrupting devices may be substituted for the various fuses.

It is believed novel to mount alternator and/or power relays and/or other physical circuit components on a printed circuit panel, using plug-in prong and socket connections, and particularly for use in a dual unit phasing system such as that of the invention. The panel affords a very compact mount of the components for disposition within a watertight-sealed casing or enclosure. Furthermore, the incorporation of the heater 20 on the printed circuit panel 28 insures that the interior of such enclosure will be safeguarded against the arising of a corrosive condition to threaten reliability of performance.

More broadly considered, the invention provides an improved alternating system for various sorts of sequentially operating units, such that a pair of such units, as alternated or coordinately powered, afford a high capacity output without corresponding increased wear. The system may be maintained in operation without interruption of service and without requiring the attention of a skilled maintenance man or special repair personnel; and the system automatically adjusts its output to the demand imposed thereon.

It will be appreciated that the circuit of FIG. 5, as well as that to the right of the jacks 73, 77 in FIG. 4, is disposed externally of the printed circuit panel 28 and its casing or enclosure (not shown).

What I claim as my invention is:

1. An alternator system for multiple motorized pump units, or other alternated units of an installation, comprising a pair of switch devices both operable in response to a changing condition of said installation in any alternating cycle of operation of the respective units, an electrical alternator relay, means electrically connecting said relay with a first of said switch devices to electrically energize the relay in said cycle upon closure of said first switch device in response to the changing condition, and a pair of electrical power relays, said alternator relay having at least one pair of normally open and closed contacts, the power relays being electrically connected respectively in circuit with a second of said switch devices and said alternator relay contact pair for energization, respectively, upon actuation of open and closed contacts of said contact pair and closure of said second switch device in said same cycle in response to the changing condition, said first switch device opening in said same cycle in response to the changing condition to de-energize the alternator relay and the system, said power relays having further contacts electrically connected with the respective alternated units to electrically energize the latter in alternation in successive cycles upon energizations of the respective power relays in response to actuation of said alternator relay contact pair.

2. An alternator system for multiple motorized pump units, or other alternated units of an installation, comprising a pair of switch devices both operable in response to a changing condition of said installation in any alternating cycle of operation of the respective units, a latching-type electrical alternator relay, means electrically connecting said relay with a first of said switch devices to electrically energize the relay in said cycle upon closure of said first switch device in response to the changing condition, and a pair of electrical power relays, said alternator relay having at least one pair of series-connected normally open and closed contacts, the power relays being electrically connected respectively in circuit with a second of said switch devices and said alternator relay contact pair for energization, respectively, upon actuation of open and closed contacts of said contact pair and closure of said second switch device in said same cycle in response to the changing condition, said first switch device opening in said same cycle in response to the changing condition to de-energize the alternator relay and the system, said power relays having further contacts electrically connected with the respective alternated units to electrically energize the latter in alternation in successive cycles upon energizations of the respective power relays in response to actuation of said alternator relay contact pair.

3. An alternator system for multiple motorized pump units, or other alternated units of an installation, comprising a pair of switch devices both operable in response to a changing condition of said installation in any alternating cycle of operation of the respective units, an electrical alternator relay, means electrically connecting said relay with a first of said switch devices to electrically energize the relay in said cycle upon closure of said first switch device in response to the changing condition, and a pair of electrical power relays, said alternator relay having at least one pair of normally open and closed contacts, the power relays being electrically connected respectively in circuit with a second of said switch devices and said alternator relay contact pair for energization, respectively, upon actuation of open and closed contacts of said contact pair and closure of said second switch device in said same cycle in response to the changing condition, said power relays having holding contacts which are closed in response to energization of said respective power relays and are electrically connected between said first switch device and said alternator relay contacts to shunt said second switch device, thus to maintain energization of said alternator relay contacts when said second device opens in response to the changing condition, said first switch device opening in said same cycle in response to the changing condition to de-energize the alternator relay and the system, said power relays having further contacts electrically connected with the respective alternated units to electrically energize the latter in alternation in successive cycles upon energizations of the respective power relays in response to actuation of said alternator relay contact pair.

4. An alternator system for multiple motorized pump units, or other alternated units of an installation, comprising a pair of switch devices both operable in response to a changing condition of said installation in any alternating cycle of operation of the respective units, a latching-type electrical alternator relay, means electrically connecting said relay with a first of said switch devices to electrically energize the relay in said cycle upon closure of said first switch device in response to the changing condition, and a pair of electrical power relays, said alternator relay having at least one pair of series-connected normally open and closed contacts, the power relays being electrically connected respectively in circuit with a second of said switch devices and said alternator relay contact pair for energization, respectively, upon actuation of open and closed contacts of said contact pair and closure of said second switch device in said same cycle in response to the changing condition, said power relays having holding contacts which are closed in response to energization of said respective power relays and are electrically connected between said first switch device and said alternator relay contacts to shunt said second switch device, thus to maintain energization of said alternator relay contacts when said second device opens in response to the changing condition, said first switch device opening in said same cycle in response to the changing condition to de-energize the alternator relay and the system, said power relays having further contacts electrically connected with the respective alternated units to electrically energize the latter in alternation in successive cycles upon energizations of the respective power relays in response to actuation of said alternator relay contact pair.

5. An alternator system for multiple motorized pump units, or other alternated units of an installation, comprising a pair of switch devices both operable in response to a changing condition of said installation in any alternating cycle of operation of the respective units, an electrical alternator relay, means electrically connecting said relay with a first of said switch devices to electrically energize the relay in said cycle upon closure of said first switch device in response to the changing condition, a pair of electrical power relays, said alternator relay having pairs of normally open and closed contacts, the power relays being electrically connected respectively in circuit with a second of said switch devices and said alternator relay contact pairs for energization, respectively, upon actuation of open and closed contacts of one of said contact pairs and closure of said second switch device in said same cycle in response to the changing condition, said first switch device opening in said same cycle in response to the changing condition to de-energize the alternator relay and the system, said power relays having further contacts electrically connected with the respective alternated units to electrically energize the latter in alternation in successive cycles upon energizations of the respective power relays in response to actuation of said one of said alternator relay contact pairs, and a further condition-responsive switch electrically connected through the other of said alternator relay contact pairs to said power relays to energize the latter and simultaneously energize both of said alternated units in any cycle in response to the changing condition.

6. An alternator system for multiple motorized pump units, or other alternated units of an installation, comprising a pair of switch devices both operable in response to a changing condition of said installation in any alternating cycle of operation of the respective units, a latching-type electrical alternator relay, means electrically connecting said relay with a first of said switch devices to electrically energize the relay in said cycle upon closure of said first switch device in response to the changing condition, a pair of electrical power relays, said alternator relay having pairs of series-connected normally open and closed contacts, the power relays being electrically connected respectively in circuit with a second of said switch devices and said alternator relay contact pairs for energization, respectively, upon actuation of open and closed contacts of one of said contact pairs and closure of said second switch device in said same cycle in response to the changing condition, said first switch device opening in said same cycle in response to the changing condition to de-energize the alternator relay and the system, said power relays having further contacts electrically connected with the respective alternated units to electrically energize the latter in alternation in successive cycles upon energizations of the respective power relays in response to actuation of said one of said alternator relay contact pairs, and a further condition-responsive switch electrically connected through the other of said alternator relay contact pairs to said power relays to energize the latter and simultaneously energize both of said alternated units in any cycle in response to the changing condition.

7. An alternator system for multiple motorized pump units, or other alternated units of an installation, comprising a pair of switch devices both operable in response to a changing condition of said installation in any alternating cycle of operation of the respective units, an electrical alternator relay, means electrically connecting said relay with a first of said switch devices to electrically energize the relay in said cycle upon closure of said first switch device in response to the changing condition, a pair of electrical power relays, said alternator relay having pairs of normally open and closed contacts, the power relays being electrically connected respectively in circuit with a second of said switch devices and said alternator relay contact pairs for energization, respectively, upon actuation of open and closed contacts of one of said contacts pairs and closure of said second switch device in said same cycle in response to the changing condition, said power relays having holding contacts which are closed in response to energization of said respective power relays and are electrically connected between said first switch device and said alternator relay contacts to shunt said second switch device, thus to maintain energization of said alternator relay contacts when said second device opens in response to the changing condition, said first switch device opening in said same cycle in response to the changing condition to de-energize the alternator relay and the system, said power relays having further contacts electrically connected with the respective alternated units to electrically energize the latter in alternation in successive cycles upon energizations of the respective power relays in response to actuation of said one of said alternator relay contact pairs, and a further condition-responsive switch electrically connected through the other of said alternator relay contact pairs to said power relays to energize the latter and simultaneously energize both of said alternated units in any cycle in response to the changing condition.

8. An alternator system for multiple motorized pump units, or other alternated units of an installation, comprising a pair of switch devices both operable in response to a changing condition of said installation in any alternating cycle of operation of the respective units, a latching-type electrical alternator relay, means electrically connecting said relay with a first of said switch devices to electrically energize the relay in said cycle upon closure of said first switch device in response to the changing condition, a pair of electrical power relays, said alternator relay having pairs of series-connected, normally open and closed contacts, the power relays being electrically connected respectively in circuit with a second of said switch devices and said alternator relay contact pairs for energization, respectively, upon actuation of open and closed contacts of one of said contact pairs and closure of said second switch device in said same cycle in response to the changing condition, said power relays having holding contacts which are closed in response to energization of said respective power relays and are electrically connected between said first switch device and said alternator relay contacts to shunt said second switch device, thus to maintain energization of said alternator relay contacts when said second device opens in response to the changing condition, said first switch device opening in said same cycle in response to the changing condition to de-energize the alternator relay and the system, said power relays having further contacts electrically connected with the respective alternated units to electrically energize the latter in alternation in successive cycles upon energizations of the respective power relays in response to actuation of said one of said alternator relay contact pairs, and a further condition-responsive switch electrically connected through the other of said alternator relay contact pairs to said power relays to energize the latter and simultaneously energize both of said alternated units in any cycle in response to the changing condition.

9. An alternator system for multiple motorized pump units adapted to be disposed in a liquid container for operation of the respective pump units in alternating cycles, comprising a pair of switch devices disposable in said container and both operable in response to a changing liquid level in the latter acting on said devices in any of the alternating cycles, an electrical alternator relay, means electrically connecting said relay with a first of said switch devices to electrically energize the relay in said cycle upon closure of said first switch device in response to the changing level, and a pair of electrical power relays, said alternator relay having at least one pair of normally open and closed contacts, the power relays being electrically connected respectively in circuit with a second of said switch devices and said alternator relay contact pair for energization, respectively, upon actuation of open and closed contacts of said contact pair and closure of said second switch device in said same cycle in response to the changing liquid level, said first switch device opening in said same cycle in response to a changing level to de-energize the alternator relay and the system, said power relays having further contacts electrically connected with the respective motorized pump units to electrically energize the latter in alternation in successive cycles upon energizations of the respective power relays in response to actuation of said alternator relay contact pair.

10. An alternator system for multiple motorized pump units adapted to be disposed in a liquid container for operation of the respective pump units in alternating cycles, comprising a pair of switch devices disposable in said container and both operable in response to a changing liquid level in the latter acting on said devices in any of the alternating cycles, an electrical alternator relay, means electrically connecting said relay with a first of said switch devices to electrically energize the relay in said cycle upon closure of said first switch device in response to the changing level, a pair of electrical power relays, said alternator relay having pairs of normally open and closed contacts, the power relays being electrically connected respectively in circuit with a second of said switch devices and said alternator relay contact pairs for energization, respectively, upon actuation of open and closed contacts of one of said contact pairs and closure of said second switch device in said same cycle in response to the changing liquid level, said first switch device opening in said same cycle in response to a changing level to de-energize the alternator relay and the system, said power relays having further contacts electrically connected with the respective motorized pump units to electrically energize the latter in alternation in successive cycles upon energizations of the respective power relays in response to actuation of said one of said alternator relay contact pairs, and a further liquid level-responsive switch disposable in said container and electrically connected through the other of said alternator relay contact pairs to said power relays to energize the latter and simultaneously energize both of said pump units in any cycle in response to the changing liquid level.

11. An alternator system for multiple motorized pump units adapted to be disposed in a liquid container for operation of the respective pump units in alternating cycles, comprising a pair of switch devices disposable in said container and both operable in response to a changing liquid level in the latter acting on said devices in any of the alternating cycles, an electrical alternator relay, means electrically connecting said relay with a first of said switch devices to electrically energize the relay in said cycle upon closure of said first switch device in response to the changing level, a pair of electrical power relays, said alternator relay having pairs of normally open and closed contacts, the power relays being electrically connected respective- ly in circuit with a second of said switch devices and said alternator relay contact pairs for energization, respectively, upon actuation of open and closed contacts of one of said contact pairs and closure of said second switch device in said same cycle in response to the changing liquid level, said power relays having holding contacts which are closed in response to energization of said respective power relays and are electrically connected between said first switch device and said alternator relay contacts to shunt said second switch device, thus to maintain energization of said alternator relay contacts when said second device opens in response to a changing liquid level, said first switch device opening in said same cycle in response to the changing level to de-energize the alternator relay and the system, said power relays having further contacts electrically connected with the respective motorized pump units to electrically energize the latter in alternation in successive cycles upon energizations of the respective power relays in response to actuation of said one of said alternator relay contact pairs, and a further liquid level-responsive switch device disposable in said container and electrically connected through the other of said alternator relay contact pairs to said power relays to energize the latter and simultaneously energize both of said pump units in any cycle in response to the changing liquid level.

12. An alternator system in accordance with claim 5, and further comprising an electrical alarm unit electrically connected to said further switch to signal in the event of operation of the switch.

13. An alternator system in accordance with claim 7, and further comprising an electrical alarm unit electrically connected to said further switch to signal in the event of operation of the switch.

14. An alternator system for multiple motorized pump units, or other alternated units of an installation, comprising a pair of control devices both operable in response to a changing condition of said installation in any alternating cycle of operation of the respective units, an electrical alternator relay, means operatively connecting said relay with a first of said control devices to electrically energize the relay in said cycle upon operation of said first control device in response to the changing condition, and a pair of electrical power relays, said alternator relay having at least one pair of normally open and closed contacts, the power relays being operatively connected with a second of said control devices and in circuit with said alternator relay contact pair for energization, respectively, upon actuation of open and closed contacts of said contact pair and operation of said second control device in said same cycle in response to the changing condition, said first control device operating in said same cycle in response to the changing condition to de-energize the alternator relay and the system, said power relays having further contacts electrically connected with the respective alternated units to electrically energize the latter in alternation in successive cycles upon energizations of the respective power relays in response to actuation of said alternator relay contact pair.

15. An alternator system for multiple motorized pump units adapted to be disposed in a liquid container for operation of the respective pump units in alternating cycles, comprising a pair of control devices disposable in said container and both operable in response to a changing liquid level in the latter acting on said devices in any of the alternating cycles, an electrical alternator relay, means electrically connecting said relay with a first of said control devices to electrically energize the relay in said cycle upon operation of said first control device in response to the changing level, and a pair of electrical power relays, said alternator relay having at least one pair of normally open and closed contacts, the power relays being operatively connected with a second of said control devices and in circuit with said alternator relay contact pair for energization, respectively, upon actuation of open and closed contacts of said contact pair and operation of said second control device in said same cycle in response to the changing liquid level, said first control device opening in said same cycle in response to a changing level to de-energize the alternator relay and the system, said power relays having further contacts electrically connected with the respective motorized pump units to electrically energize the latter in alternation in successive cycles upon energizations of the respective power relays in response to actuation of said alternator relay contact pair.

16. An alternator system for multiple motorized pump units adapted to be disposed in a liquid container for operation of the respective pump units in alternating cycles, comprising a pair of control devices disposable in said container and both operable in response to a changing liquid level in the latter acting on said devices in any of the alternating cycles, an electrical alternator relay, means operatively connecting said relay with a first of said control devices to electrically energize the relay in said cycle upon operation of said first control device in response to the changing level, a pair of electrical power relays, said alternator relay having pairs of normally open and closed contacts, the power relays being operatively connected with a second of said control devices and in circuit with said alternator relay contact pairs for energization, respectively, upon actuation of open and closed contacts of one of said contact pairs and operation of said second control device in said same cycle in response to the changing liquid level, said first control device operating in said same cycle in response to the changing level to de-energize the alternator relay and the system, said power relays having further contacts electrically connected with the respective motorized pump units to electrically energize the latter in alternation in successive cycles upon energizations of the respective power relays in response to actuation of said one of said alternator relay contact pairs, and a further liquid level-responsive control device disposable in said container and operatively connected to the other of said alternator relay contact pairs and to said power relays to energize the latter and simultaneously energize both of said pump units in any cycle in response to the changing liquid level.

References Cited by the Examiner
UNITED STATES PATENTS

| | | | |
|---|---|---|---|
| 1,982,578 | 11/1934 | Durdin | 103—11 |
| 2,029,765 | 2/1936 | Durdin | 103—11 |
| 2,042,169 | 5/1936 | Coals | 318—482 X |
| 2,060,755 | 11/1936 | Exner | 318—102 |
| 2,147,073 | 2/1939 | Wood et al. | 103—11 X |
| 2,482,496 | 9/1949 | McGillivray | 103—11 X |
| 2,645,749 | 7/1953 | Labino | 318—102 X |
| 2,995,143 | 8/1961 | Strathearn et al. | 103—25 |
| 3,005,411 | 10/1961 | Metz | 103—11 |
| 3,029,367 | 4/1962 | Tomonoh | 317—101 |
| 3,050,003 | 8/1962 | Edwards | 103—25 |
| 3,060,858 | 10/1962 | Shoosmith | 103—11 |
| 3,133,502 | 5/1964 | Johnston | 103—25 |
| 3,162,788 | 12/1964 | Allen et al. | 317—101 |

MARTIN P. SCHWADRON, *Primary Examiner.*

DONLEY J. STOCKING, SAMUEL LEVINE,
*Examiners.*

W. L. FREEH, *Assistant Examiner.*